United States Patent
Komada et al.

[11] Patent Number: 5,810,981
[45] Date of Patent: Sep. 22, 1998

[54] THREE PHASE HYDROGEN OCCLUDING ALLOY AND ELECTRODE MADE OF THE ALLOY

[75] Inventors: Norikazu Komada; Mitsugu Matsumoto; Shinichiro Kakehashi; Yoshitaka Tamo, all of Omiya, Japan; Chris N. Christodoulou, Nicosia, Cyprus

[73] Assignee: Mitsubishi Materials Corporation, Tokyo, Japan

[21] Appl. No.: 613,990

[22] Filed: Mar. 8, 1996

[30] Foreign Application Priority Data

| Mar. 9, 1995 | [JP] | Japan | 7-078229 |
| Jun. 27, 1995 | [JP] | Japan | 4-183513 |
| Jul. 10, 1995 | [JP] | Japan | 7-196951 |

[51] Int. Cl.$^6$ .................... H01M 38/04; C22C 30/00
[52] U.S. Cl. .................... 204/293; 420/580; 420/900; 420/455; 148/409; 148/419; 148/426; 148/442; 429/59; 429/223; 204/293
[58] Field of Search .................... 420/455, 580, 420/900; 148/409, 419, 426, 442; 429/59, 101, 223; 204/293; 423/644

[56] References Cited

U.S. PATENT DOCUMENTS

| 4,457,891 | 7/1984 | Bernauer et al. | 420/580 |
| 4,728,586 | 3/1988 | Venkatesan et al. | 429/94 |
| 4,849,205 | 7/1989 | Hong | 423/644 |
| 4,898,794 | 2/1990 | Doi et al. | 429/59 |
| 4,983,474 | 1/1991 | Doi et al. | 429/59 |
| 5,043,233 | 8/1991 | Kameoka et al. | 429/59 |
| 5,096,667 | 3/1992 | Fetcenko | 420/580 |
| 5,238,756 | 8/1993 | Fetcenko et al. | 420/900 |
| 5,277,998 | 1/1994 | Furukawa et al. | 429/59 |
| 5,290,509 | 3/1994 | Furukawa et al. | 420/900 |
| 5,330,861 | 7/1994 | Fetcenko et al. | 420/900 |
| 5,541,017 | 7/1996 | Hong et al. | 420/455 |
| 5,690,799 | 11/1997 | Tsukahara et al. | 204/293 |

FOREIGN PATENT DOCUMENTS

| 0 503 686 A2 | 9/1992 | European Pat. Off. . |
| 0 588 310 A2 | 3/1994 | European Pat. Off. . |
| 0 588 310 A3 | 3/1994 | European Pat. Off. . |
| 60-241652 | 11/1985 | Japan . |
| 4-168239 | 6/1992 | Japan . |
| 4-328256 | 11/1992 | Japan . |
| 0 552 790 A1 | 7/1993 | Japan . |

(List continued on next page.)

OTHER PUBLICATIONS

"Effects of partial substitution and anodic oxidation treatment of Zr–V–Ni alloys on electrochemical properties", Journal of the Less–Common Metals, 172–174 (1991) 1219–1226, S. Wakao and H. Sawa.

"Effects of pretreatment on the activation behavior of $Zr(V_{0.25}Ni_{0.75})_2$ metal hydride electrodes in alkaline solution", Journal of Alloys and Compounds, 209 (1994) 99–105, Zuttel, et al.

(List continued on next page.)

*Primary Examiner*—Margery Phipps
*Attorney, Agent, or Firm*—Nikaido Marmelstein Murray & Oram, LLP

[57] ABSTRACT

There is provided a hydrogen occluding alloy exhibiting high absorption and desorption speeds. A hydrogen occluding alloy comprising as an overall composition: 25 to 45 weight % Zr+Hf, wherein the Hf comprises not more than 4%, 1 to 15 weight % Ti, 10 to 20 weight % Mn, 2 to 12 weight % V, 0.6 to 5 weight % rare earth elements, and a balance Ni (of which content is not less than 25 weight %) and unavoidable impurities, and basically having a three-phase structure consisting of: a net-shaped continuous phase which is made of a Ni—Zr type alloy, a main phase (in the net-shaped continuous phase) made of a Zr—Ni—Mn based alloy, and a dispersed granular phase made of a rare earth elements-Ni type alloy distributed along the net-shaped continuous phase.

25 Claims, 5 Drawing Sheets

FOREIGN PATENT DOCUMENTS

| | | |
|---|---|---|
| 5-217578 | 8/1993 | Japan . |
| 5-247568 | 8/1993 | Japan . |
| 5-287422 | 11/1993 | Japan . |
| 6-283169 | 7/1994 | Japan . |
| 0 609 609 A2 | 8/1994 | Japan . |
| 6-187983 | 8/1994 | Japan . |

OTHER PUBLICATIONS

Journal of Alloys and Compounds, 224 (Jun. 1995) 121–126, "Hydrogen Absorbing–Desorbing Properties and Crystal Structure of the Zr–Ti–Ni–Mn–V $AB_2$ Laves Phase Alloys", M. Yoshida.

Journal of Alloys and Compounds 231 (Dec. 1995) 392–396, "Surface and Metallographic Microstructure of the La–added $Ab_2$ compound (Ti,Zr) (Mn, Cr, Ni)$_2$", F.–J. Liu and Sandrock, S. Suda.

"Hydrogen absorption alloys for Nickel–Hydrogen rechargeable batteries", Advanced Material '93, V/A: Eco-materials, pp. 1994, 555–559, Matsumoto et al.

"F–treatment effect on the hydriding properties of La–substituted $AB_2$ compound $(Ti,Zr)(Mn,Cr,Ni)_2$", Int'l. Symposium on Metal–Hydrogen Systems Fundametals & Applns., Nov. 6–11, 1994, F.–J.Liu and S.Suda.

"Surface and metallographic microstructure of La–substituted $AB_2$ compound $(Ti,Zr)(Mn,Cr,Ni)_2$", Intl. Symposium on Metal–Hydrogen Systems Fundamentals & Applns., Nov. 6–11, 1994, F.–J, G.Sandrock and S.Suda.

"Activation behaviour of $ZrCrNiM_{0.05}$ metal hydride electrodes (M≡La, Mm (misch metal), Nd)", Journal of Alloys and Compounds, 185, (1992) Soo–Ryoung Kim and Jai–Young Lee, pp. L1–L4.

"Hydrogen Absorption and Electrode Characteristics of (Ti, Zr)–(Ni,V,X)2+α Alloys", Zeitschrift fur Physikalische Chemie, B. 183, S.347–353 (1994), Miyamura et al.

"Hydrogen absorption–desorption characteristics of Ti0.35Zr0.65NixV2–x–yMny alloys with C14 Laves phase for nickel/metal hydride batteries", Journal of Alloys and Compounds, 227 (1995), Yang et al.

THREE PHASE HYDROGEN OCCLUDING ALLOY AND ELECTRODE MADE OF THE ALLOY

FIELD OF THE INVENTION

The present invention relates to a hydrogen occluding alloy exhibiting significant high-speed absorption and discharge of hydrogen and capable of attaining excellent initial activation and large discharge current when adapted to, for example, the electrode of a battery.

BACKGROUND OF THE INVENTION

Hitherto a variety of hydrogen occluding alloys have been suggested, as exemplified by the hydrogen occluding alloy disclosed recently in "International Symposium About Foundation And Application Of Metal-Hydrogen System", held on Nov. 6 to 11, 1994, in Fujiyoshida, Japan, in which there are disclosed alloy samples prepared from compositions according to the formula: $Ti_{0.5-x/2}Zr_{0.5-x/2}La_xMn_{0.8}Cr_{0.8}Ni_{0.4}$, in which $x=0.0\sim0.1$.

A fact has been known that the foregoing hydrogen occluding alloy has a hydrogen absorbing (i.e., hydrogen occluding) function with which an ingot La—Ni type alloy phase dissociates hydrogen-bearing molecules (e.g., $H_2$, $H_2O$) or ions (e.g., $H_3O^+$) in the atmosphere to provide hydrogen atoms (H) due to the catalyzing function thereof and absorbs dissociated hydrogen atoms at a speed significantly higher than the speed at which the main phase absorbs hydrogen atoms, and therefore the absorption of hydrogen atoms is mainly carried out through the La—Ni type alloy. On the other hand, the hydrogen discharge is performed by a function contrary to the foregoing function, i.e., by reversing the absorption.

In a case where the hydrogen occluding alloy is adapted to, for example, the electrode for a battery, a fact has been known that the electrode including the hydrogen occluding alloy is subjected to initial activation by repeating charging and discharging until the electrode has a sufficiently large discharge capacity (that is, until the discharge capacity, attainable due to the hydrogen occluding alloy, becomes maximum). The battery is put to practical use after the initial activation has been performed.

OBJECTS OF THE INVENTION

There has recently arisen great desires for batteries and heat pumps, to which the hydrogen occluding alloy is adapted frequently, to enlarge the output and improve the performance thereof and to be capable of saving energy. Therefore, the hydrogen occluding alloy has been required to attain hydrogen absorption and discharge speeds higher than those realized by the conventional hydrogen occluding alloy, and to be capable of completing the initial activation in a short time when put to practical use.

SUMMARY OF THE INVENTION

The present invention is directed to a hydrogen occluding alloy with increased hydrogen absorption and desorption (same as "discharge") speeds.

According to the present invention, there is provided an alloy which has at least three phases which together provide a unique hydrogen occluding alloy which provides rapid hydrogen absorption and desorption, as well as rapid initial activation and large discharge current. The three phases include (1) a net-shaped continuous phase, (2) a main phase (in the net-shaped continuous phase), and (3) a dispersed granular phase. In FIG. 1, there is shown an alloy in accordance with the present invention, in which there is seen a net-shaped continuous phase 11, a main phase 12 and a dispersed phase 13.

In the hydrogen occluding alloy of the present invention, the dispersed granular phase absorbs hydrogen-bearing molecules (e.g., $H_2$, $H_2O$, etc.) or hydrogen-bearing ions (e.g., $H_3O^+$) in the atmosphere at high speed, and the dispersed granular phase serves as a catalyst for dissociating the absorbed hydrogen-bearing molecules or ions to provide hydrogen atoms (H). The majority of dissociated hydrogen atoms travel quickly via the interface between the net-shaped continuous phase and the main phase, at a speed higher than the speed at which hydrogen atoms are diffused into the main phase. Diffusion of hydrogen atoms into the main phase is mainly performed from the surrounding interface.

Therefore, hydrogen can be absorbed at a significantly high speed. Desorption of hydrogen is performed in reverse diffusion and recombination of hydrogen atoms into molecules or ions, thus realizing significantly high speed.

The present invention also relates to electrodes made of the hydrogen occluding alloy described above.

The new combined microstructure according to the present invention is obtained by means of a new process. According to the new process, an alloy is homogenized, followed by being subjected to a heat treatment in which the alloy is heated to the solid-liquid coexisting temperature for the alloy which forms the net-shaped continuous phase, and then the temperature is maintained, followed by rapidly cooling the alloy. As a result, the foregoing alloy has a structure including at least the three phases described above. The foregoing homogenization step may be omitted, if desired, and the three-phase structure is still obtained.

DETAILED DESCRIPTION OF THE PREFERRED EMBODIMENTS

Figure 2:
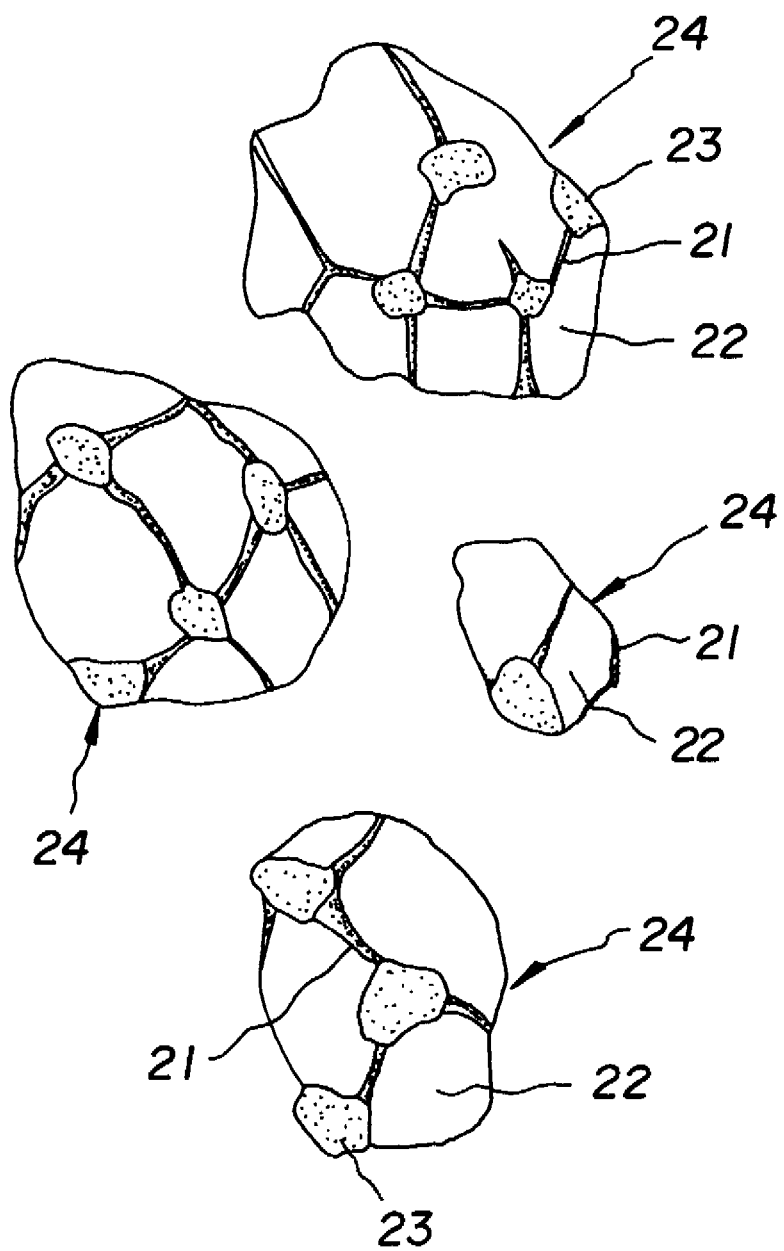
FIG. 2 is an enlarged schematic view of the structure of the hydrogen occluding alloy immediately after being crushed for hydrogenation for use in manufacturing the hydrogen occluding alloy according to the present invention.

In accordance with a preferred embodiment in accordance with the present invention, as shown in FIG. 2, there is provided a powder particle made of hydrogen occluding alloy having a three-phase structure comprising:

a net-shaped continuous phase 21 which is made of a Ni—Zr type alloy, a main phase 22 in the net-shaped continuous phase, the main phase being made of a Zr—Ni—Mn based alloy, and a dispersed granular phase 23 made of rare earth elements-Ni type alloy, distributed along the net-shaped continuous phase.

The alloy has an overall composition, by weight % (hereinafter called "%"), comprising:

25 to 45% Zr, 1 to 15% Ti, 10 to 20% Mn, 2 to 12% V, 0.6 to 5% rare earth elements, unavoidable impurities, and at least 25% Ni.

The alloy may optionally further comprise up to 4% Hf.

Figure 5:
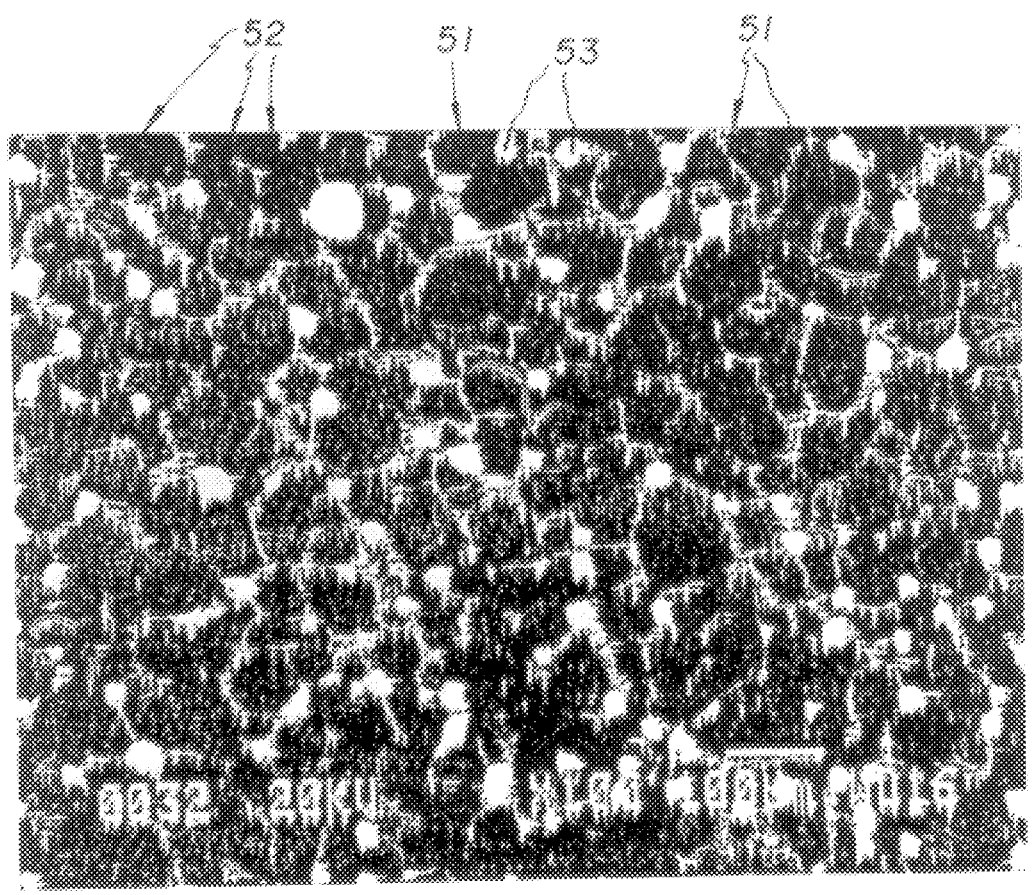
FIG. 5 is an SEM of an alloy composition according to the present invention.

FIG. 5 is an SEM of an alloy composition according to the present invention, comprising 34.5% Zr, 3.5% La, 6.0% Ti, 34.7% Ni, 16.2% Mn and 5.0% V. In FIG. 5, there is seen a net-shaped continuous phase 51, a main phase 52 and a dispersed phase 53.

In a first preferred aspect of the present invention, the alloy has an overall composition comprising:

25 to 37% Zr, 5 to 15% Ti, 10 to 20% Mn, 2 to 6% V, 0.6 to 5% of at least one of La and Ce, unavoidable impurities, and the balance Ni, the amount of Ni being at least 25%.

The alloy according to this first preferred aspect of the present invention may optionally further comprise 0.1 to 2% Hf.

In a second preferred aspect of the present invention, the alloy has an overall composition comprising:

30 to 38% Zr, 4 to 9% Ti, 14 to 18% Mn, 4 to 8% V, 1 to 4% of elemental rare earth, unavoidable impurities, and the balance Ni, the amount of Ni being at least 25%.

The alloy according to this second preferred aspect of the present invention may optionally further comprise up to 2% Hf.

In a third preferred aspect of the present invention, the alloy has an overall composition comprising:

30 to 37% Zr, 5 to 9% Ti, 14 to 18% Mn, 4 to 6% V, 1 to 4% of at least one of La and Ce, unavoidable impurities, and the balance Ni, the amount of Ni being at least 25%.

The alloy according to this third preferred aspect of the present invention may optionally further comprise 0.1 to 2% Hf.

The rare earth elements in the alloys according to the present invention preferably comprise at least one of La, Ce, Nd and Pr. The rare earth elements more preferably consist essentially of La and/or Ce.

It is possible to use any of the various forms of misch metal (usually containing La and Ce together with smaller amounts of Nd and/or Pr) to supply rare earth.

According to a process in accordance with the present invention, an ingot is prepared by mixing and melting Ni, Zr, Ti, Mn, V and rare earth (and optionally Hf) in amounts within the ranges discussed above, and then casting the ingot. The ingot is then subjected to heat treatment in a non-oxidizing atmosphere so as to be homogenized, followed by being subjected to a heat treatment in which the ingot is, in a non-oxidizing atmosphere, heated to 1,100° C. to 1,200° C., which is the solid-liquid coexisting temperature for the alloy which forms the net-shaped continuous phase, and then the temperature is maintained, followed by rapidly cooling the ingot. As a result, the foregoing alloy has a structure including at least the three phases described above.

The homogenization step may be omitted, which generally results in the production of a three-phase structure (including the same three phases which are produced when the homogenization step is conducted), in which the shapes occupied by the main phase are not as regular in shape and size as those obtained when the homogenization step is conducted. In addition, other phases may be formed and voids might be produced.

When the above ingot is cast, it includes the three phases discussed above, and it is believed that there are typically the other unavoidable phases. The homogenization step may be conducted at a temperature of from about 850° C. to about 1080° C., preferably about 950° C. to about 1050° C., for up to about 25 hours, preferably 5 to 20 hours. Increased homogeneity is desirable to maximize uniformity (and thus hydrogen absorption and desorption), but excessive homogenization time might result in excessive grain growth, resulting in slower hydrogen absorption. The homogenization step is preferably conducted for a length of time at which hydrogen absorption is maximized.

After homogenization, there is a two phase structure, the net-shaped continuous phase having dissolved.

The heat treatment step can be conducted directly after the homogenization step, or after the alloy has cooled partially or completely. The heat treatment is preferably conducted at a temperature of from about 1100° C. to about 1200° C., more preferably, from about 1120° C. to about 1160° C., for a time sufficient to provide a three-phase structure, e.g., about 3 hours.

After the heat treatment step, the alloy should be quenched quickly enough that the three-phase structure is retained. If the alloy is not cooled quickly enough, the alloy reverts to the two-phase structure (i.e., the net-shaped continuous phase dissolves). The alloy is preferably quenched so that it is reaches a temperature of 500° C. or below within 60 minutes after the conclusion of the heat treatment.

As discussed above, a sample microstructure according to the present invention comprises, and preferably consists essentially of, three phases. The expression "consists essentially of three phases" is used to mean that the alloy contains three phases (as described below), and can in addition include trace or small amounts of many other miscellaneous phases which do not affect the basic properties of the present invention, depending, e.g., on whether there is insufficient homogeneity of the chemical composition, slight temperature gradients during heat treatment, chemical and/or physical impurities, etc.

The first phase consists essentially of Ni and Zr. This phase is referred to herein as a "Ni—Zr type alloy" because it may include small amounts of materials other than Ni and Zr, e.g., a suitable Ni—Zr type alloy may consist of 41.4–41.9% Zr, 48.8–50.4% Ni, and about 8% other ingredients. It is believed, based on electron-probe microanalysis, that the phase is essentially a Ni—Zr binary alloy or intermetallics phase. The first phase is a "net-shaped continuous phase" which morphologically forms facets with finite thickness of neatly packed numerous polyhedrons of various shapes without any gaps. The net-shaped continuous phase can therefore be described as a wall of isotropic honeycomb structure. The word "net" is obtained from observation of the sample's cross-section. For example, if a honeycomb is cut laterally across the cells, there is seen a pattern which resembles a net (or network). The word "isotropic" indicates that the honeycomb structure is such that any cross-section will exhibit a network pattern, regardless of the cutting direction or position. The cells form closed polyhedron spaces, except for the vicinity of the sample's outer surface. The cross-section of the honeycomb of this invention is not necessarily regular hexagon, and it can be any polygon. In addition, the sides can be bending or winding.

The second phase, i.e., the "main phase in the net-shaped continuous phase" fills the cells or polyhedrons of the isotropic honeycomb structure. This phase is referred to as a "main" phase because the fraction of the second phase should be as large as possible. The second phase may also be called a "matrix" if the first phase is regarded as a "grain-boundary" phase.

The chemical composition of the second phase is not far from the overall composition of the alloy (because the second phase is the major phase), except for a substantial lack of rare-earth elements (which are contained in the third phase, described below). The second phase is a "Zr—Ni—Mn based alloy", which refers to an alloy whose approximate formula is $(Zr, Ti)(Ni, Mn, V)_2$.

The interface between the first and second phases should have an area which is as large as possible. The first phase is continuous so that hydrogen atoms can reach as far as possible through the interface. The thickness of the first phase should be as small as possible in order to minimize the amount of disruption caused by the first phase.

The third phase consists essentially of rare-earth element (s) and Ni. This phase is referred to herein as a "rare-earth element(s)-Ni type alloy" because it may include small amounts of materials other than rare-earth and Ni, e.g., a suitable rare-earth element(s)-Ni type alloy may consist of 71.0–78.6% La, 21.2–28.8%. Ni, and <0.4% other materials. The third phase is described as "dispersed granular phase." This phase is generally shaped like grains of rice or beans. The grains of the third phase are preferably spatially separated from each other, i.e., dispersed, and at the same time spatially intersect the interface of the first and second phases, i.e., it is "distributed along the net-shaped continuous phase". This feature is very important to the present invention in order to acquire the high performance of the alloy material. The size of the grain is relatively small. There is a trade-off with respect to the amount of the third phase, in that smaller amounts are desired because this phase does not significantly contribute to the hydrogen storage capacity, and larger amounts are desired because the density of the catalytic sites for dissociation and recombination of hydrogen-bearing molecules increases as the amount increases. In accordance with the combined function in hydrogen absorption/desorption of the three phases in the alloy according to the present invention, the first phase provides a large area of continuous interface between the first and second phases throughout the material. Hydrogen atoms can travel or diffuse very quickly in the interface which connects the outer surface and the deep inside of the material. Also, micro-scale cracks or fissures are readily introduced along the interface during the powder preparation or the similar mechanical handling, due to mechanical weaknesses. Thus, significant amounts of third phase grains are exposed to the outer environment, in addition to the grains which lie on the outer surface of the sample.

The role of the second phase is the hydrogen storage itself. This determines the storage capacity of the material.

The third phase is a catalyst for dissociation of hydrogen-bearing molecules (or ions) to provide hydrogen atoms. The third phase is also a catalyst for the reverse reaction, i.e., the recombination of hydrogen atoms into molecules (or ions). Only the surface of the phase exposed to the outer environment is effective or active. Neither molecules nor ions can penetrate the atomic lattice of this material. It is believed that the granular (third) phase also provides the three-phase alloy according to the present invention with a rapid initial activation property.

The expected hydrogen behavior according to the present invention is described as follows:

(1) hydrogen-bearing molecules (or ions) reach the exposed surface of the third-phase grains which are on the outer surface of the material or which touch the open cracks of the material;

(2) hydrogen-bearing molecules (or ions) dissociate to provide hydrogen atoms very quickly by the catalytic effect of the third phase;

(3) some dissociated hydrogen atoms diffuse directly into the adjacent second phase, and the majority of the dissociated hydrogen atoms quickly travel deep into the material via the interface between the first and second phases;

(4) then, hydrogen atoms diffuse into the second phase from the surrounding interface, i.e., essentially in all directions throughout the material; and (5) thus, the overall hydrogen storage process is achieved in the material of the present invention significantly faster than in conventional materials.

The size of the material according to the present invention depends on the application for which the material is used. The alloy can be used as an anode material for a hydrogen battery in powder form. In such a case, the size of each cell of the honeycomb structure must be not larger than the size of the powder particle (which is typically several tens of micrometers). Preferably, the cell size should be one-half the size of each cell of the honeycomb structure, or smaller. The alloy can be used in more chunky (i.e., larger) shapes for hydrogen storage media as a component of a metal hydride heat pump system or simple hydrogen gas container. The size of each cell can be somewhat larger (as the size of the alloy chunk increases), although larger cells detract from the effectiveness of the alloy because the path of the slowest diffusion of hydrogen atoms from the interface to the central portion of the second-phase cell becomes a dominating factor in the overall charge/discharge process.

The present process comprises subjecting the alloy to a heat treatment at a temperature between the fusion temperature of Ni—Zr type alloy of the first phase and the fusion temperature of the composition of the second phase. The former temperature is always lower than the latter for any alloy having a composition within the scope of the present invention. Under this temperature, the Ni—Zr type alloy precipitates from the "mother" phase because of supersaturation of the "mother" phase. This Ni—Zr type alloy is distributed along the grain-boundary of the "mother" phase because it is the weakest site in the alloy, and the second phase is wettable to the liquid-state first phase. If the resulting material is cooled quickly enough that the first phase does not dissolve back into the second phase (which would result in a two-phase structure), the honeycomb structure according to the present invention is obtained. Thus, the quenching step is an important step because it retains the three phases until completely cooled. The fusion temperature of the rare earth element(s)-Ni alloy of the third phase is far below that of the Ni—Zr alloy. The third phase is therefore in a liquid state (as is the first phase) during the heat treatment. However, these two phases do not mix with each other, similar to the way that liquid oil and water do not mix. The third phase is not wettable to the second phase.

The homogenization step of the present invention (carried out prior to the heat-treatment according to the present invention) does not provide a homogeneous alloy. The third phase survives through the homogenization treatment because it does not dissolve into the "mother" phase. However, the other phases introduced during a conventional casting are dissolved into the "mother" phase during the homogenization treatment.

The reason the overall composition of the hydrogen occluding alloy according to the present invention is limited to the foregoing ranges will now be described.

(a) Zr

The Zr component has, as described above, the function of forming the main phase in the net-shaped continuous phase in association with mainly Ni, Mn, Ti and V to contribute to enlargement of the quantity of hydrogen that can be occluded per unit mass of alloy (i.e., the hydrogen storage capacity). Furthermore, it has another function of forming the net-shaped continuous phase in association with mainly Ni to enable the absorption and desorption of hydrogen with the speedy diffusion to take place along the interface between the net-shaped continuous phase and the main phase. Hf, when present (in an amount up to 4%), plays a role which is similar to the role of Zr. If the ratio of the combined amount of Zr+Hf is less than 25%, the net-shaped continuous phase cannot be formed satisfactorily, in particular, thus causing the hydrogen absorption and desorption speeds to be lowered rapidly. If the ratio exceeds 45%, the ratio of the net-shaped continuous phase, that does not considerably occlude hydrogen, is raised, while the ratio of the main phase in the net-shaped continuous phase, that considerably occludes hydrogen, is relatively lowered. Thus, the hydrogen storage capacity is reduced excessively. Therefore, the ratio of Zr+Hf is determined to be 25% to 45%, preferably 30 to 38%.

(b) Ti

The Ti component has a function of lowering the equilibrium pressure for dissociating hydrogen-bearing molecules or ions of the powder to, for example, a level lower than the atmospheric pressure at, for example, room temperature so as to contribute to enhancement of absorption and desorption of hydrogen. Furthermore, Ti in the main phase described above enlarges the hydrogen storage capacity.

If the ratio of Ti is lower than 1%, a desired effect cannot be obtained from the foregoing function. If the ratio exceeds 15%, the plateau pressure (region of constant hydrogen pressure where the hydrogen-saturated metal phase exists in equilibrium with a separate hydride phase) is again raised to a level higher than the atmospheric pressure at, for example, room temperature. As a result, absorption and desorption of hydrogen deteriorate. Therefore, the ratio of Ti is determined to be 1% to 15%, preferably 4% to 9%, more preferably 5% to 9%.

(c) Mn

The Mn component has a function of mainly forming the main phase in the net-shaped continuous phase to enlarge the hydrogen storage capacity. If the ratio of Mn is less than 10%, a desired effect cannot be obtained from the foregoing function. If the ratio exceeds 20%, absorption and desorption of hydrogen are inhibited. Therefore, the ratio is determined to be 10% to 20%, preferably 14% to 18%.

(d) V

The V component has a function of stabilizing the plateau pressure of the alloy and enlarging the hydrogen storage capacity. If the ratio of V is less than 2%, a desired effect cannot be obtained from the foregoing function. If the ratio exceeds 12%, the plateau pressure is lowered excessively, thus causing desorption of occluded hydrogen to encounter a difficulty. As a result, reduction in the hydrogen storage capacity cannot be prevented. Therefore, the ratio is determined to be 2% to 12%, preferably 4% to 8%.

(e) Rare earth elements

The foregoing components are required components to form the dispersed granular phase made of rare earth elements-Ni type alloy that absorbs hydrogen-bearing molecules or ions in the atmosphere at speed higher than the speed realized by the main phase in the net-shaped continuous phase and the net-shaped continuous phase, or that desorbs hydrogen-bearing molecules or ions to the atmosphere, as described above. If the ratio of the foregoing components is 0.6% or lower, the ratio, at which the mass phase is formed, is too low to maintain the desired high speed in absorption and desorption of hydrogen. If the ratio exceeds 5%, the ratio of the dispersed granular phase made of rare earth elements-Ni type alloy, that does not significantly occlude hydrogen, is raised excessively. In this case, the hydrogen storage capacity is reduced undesirably. Therefore, the ratio of the components is determined to be 0.6% to 5%, preferably 1% to 4%.

Furthermore, in order to provide the function described above, it is preferred that the rare earth elements comprise at least one member selected from La, Ce, Nd and Pr, preferably at least one of La and Ce. In this case, it is more preferable that the amount of La and/or Ce constitutes more than 50% of the rare earth elements component, and it is most preferred that the rare earth component consists essentially of La and/or Ce.

(f) Hf

In accordance with the present invention, where Hf is present, the Hf component has, as described above, the function of forming the main phase made of Zr—Ni—Mn based alloy in association with Zr, Ni, Mn, Ti and V to contribute to hydrogen storage. It has also another function of forming a net-shaped continuous phase made of Ni—Zr type alloy in association with Ni to enable the interface diffusion of hydrogen to take place along the interface between the net-shaped continuous phase and the main phase described above.

Hf and Zr play similar roles in hydrogen absorption/storage according to the present invention. However, the weight-based discharge capacity decreases as the Hf content increases because the atomic weight of Hf is larger than that of Zr. Currently, Zr is a relatively expensive element because it usually is accompanied by 1–4% of Hf in nature, and the cost to separate Hf from Zr is very high. In accordance with one aspect of the present invention, the production cost of the alloy material can be reduced significantly due to the fact that the removal of Hf from natural Zr is not required.

(g) Ni

Especially in this invention, Ni is a very important element, because it is one of main elements of the main phase; the net-shaped continuous phase and the dispersed granular phase.

However, if the Ni content is less than 25%, the corrosion resistance is lowered against KOH electrolyte, and thus the lifetime becomes too short to be suitable for use as an electrode in a battery. Therefore, the ratio of the Ni content is not less than 25%.

Though the hydrogen occluding alloy of this invention can be pulverized to obtain the powder of the prescribed particle size by any conventional mechanical pulverizing means, one way by which the powder can be obtained is by a hydrogen decrepitation process which contains the hydrogen absorption at an arbitrary temperature chosen from the range 10°~200° C. in a pressurized hydrogen atmosphere and the hydrogen desorption by evacuation. The powder thus obtained exhibits the micro structure as shown in the FIG. 2, where an enlarged schematic view is sketched.

EXAMPLES

The following Examples are illustrative of the present invention and are not intended to limit the scope thereof.

In an ordinary high-frequency induction melting furnace, Ni, Zr, Ti, Mn, V, La, Ce, Cr, Hf and misch metal each having a purity higher than 99.9% are used as raw materials, followed by being melted in an atmosphere of Ar. As a result, alloy molten metals respectively having compositions as shown in Tables 1, 3, 5, 7, 9, 11, 13, 15, 17, 19, 21 and 23 are prepared, followed by being cast in a water-cooled copper casting mold so as to be formed into ingots. As a result, hydrogen occluding alloy sample 1 to 156 according to the present invention (hereinafter called "alloy according to the present invention") are manufactured.

These ingots are subjected to homogenization treatment under conditions of a predetermined temperature of 950° C. to 1,050° C. maintained for 20 hours (except for hydrogen occluding alloy samples 149 to 156, for which the homogenization was omitted). Then, the ingots are subjected to heat treatment under conditions of a predetermined temperature from 1,100° C. to 1,200° C. in an Ar atmosphere for 8 hours, followed by being subjected to forced gas cooling using Ar gas (the foregoing heat treatment enables the net-shaped continuous phase made of the Ni—Zr type alloy to be formed).

In order to make comparisons, a conventional hydrogen occluding alloy (hereinafter called "conventional alloy") is manufactured so that its compositions are as shown in Tables 1, 5, 7 and 9 and it is manufactured under the same conditions as those for the foregoing according to the present invention, except that the heat treatment following the homogenization treatment is omitted.

The cross-section of the thus-obtained hydrogen occluding alloy is observed with a scanning electron microscope.

Figure 1:
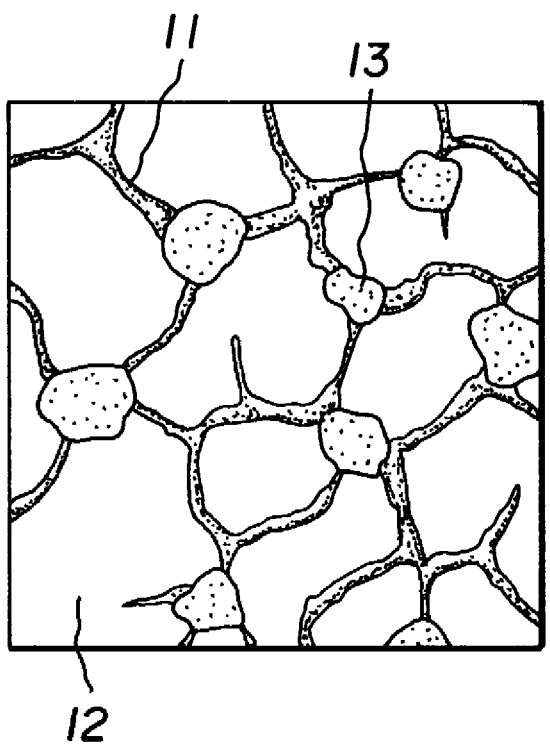
FIG. 1 is an enlarged schematic view of the cross-sectional structure of the hydrogen occluding alloy according to the present invention.

As a result, samples 1 to 156 according to the present invention are, as shown in FIG. 1, each composed mainly of a three-phase structure consisting essentially of:

a net-shaped continuous phase which is made of a Ni—Zr type alloy, a main phase in the net-shaped continuous phase, the main phase being made of a Zr—Ni—Mn based alloy, and a dispersed granular phase made of a rare earth elements-Ni type alloy, distributed along the net-shaped continuous phase.

Figure 3:
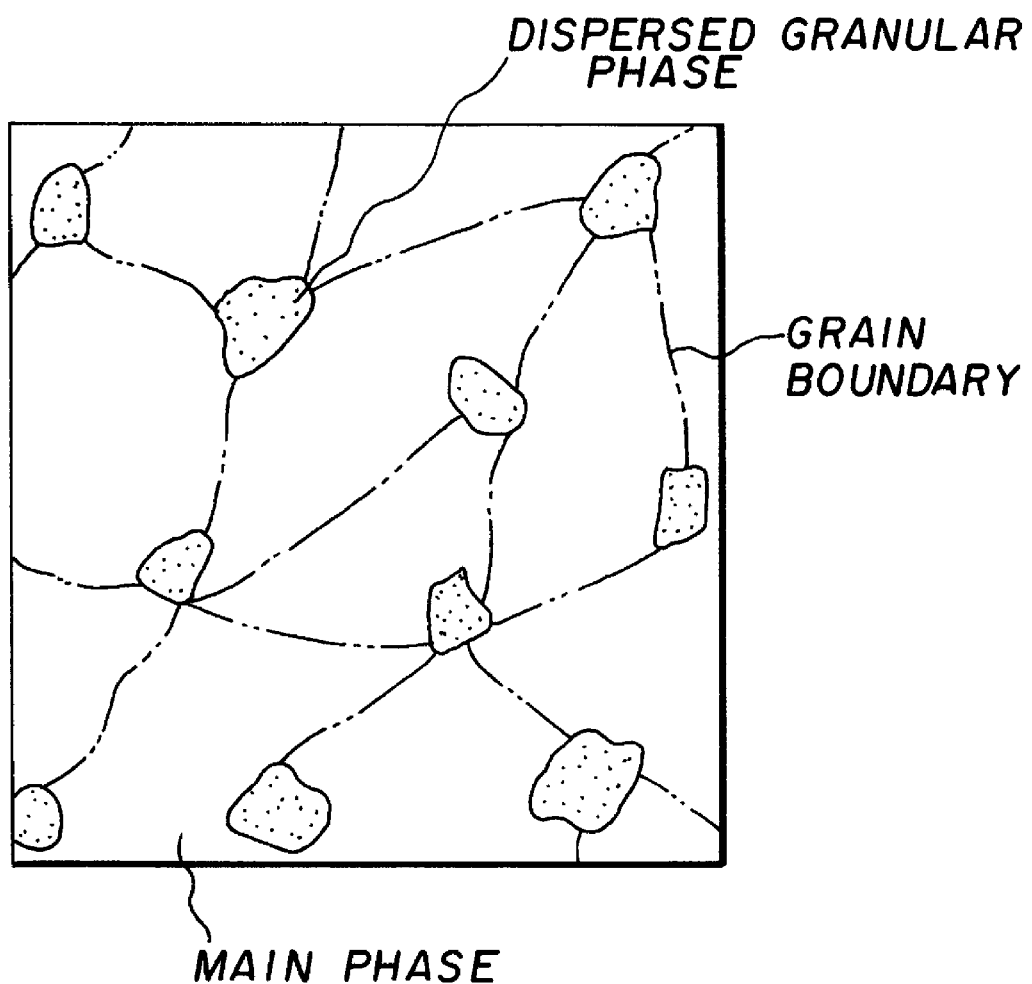
FIG. 3 is an enlarged schematic view of the cross-sectional structure of a conventional hydrogen occluding alloy.

On the other hand, the conventional alloy has the two-phase structure consisting of the main phase made of the Zr—Ni—Mn based alloy and the dispersed phase made of the La—Ni type alloy, as shown in FIG. 3.

Figure 4:
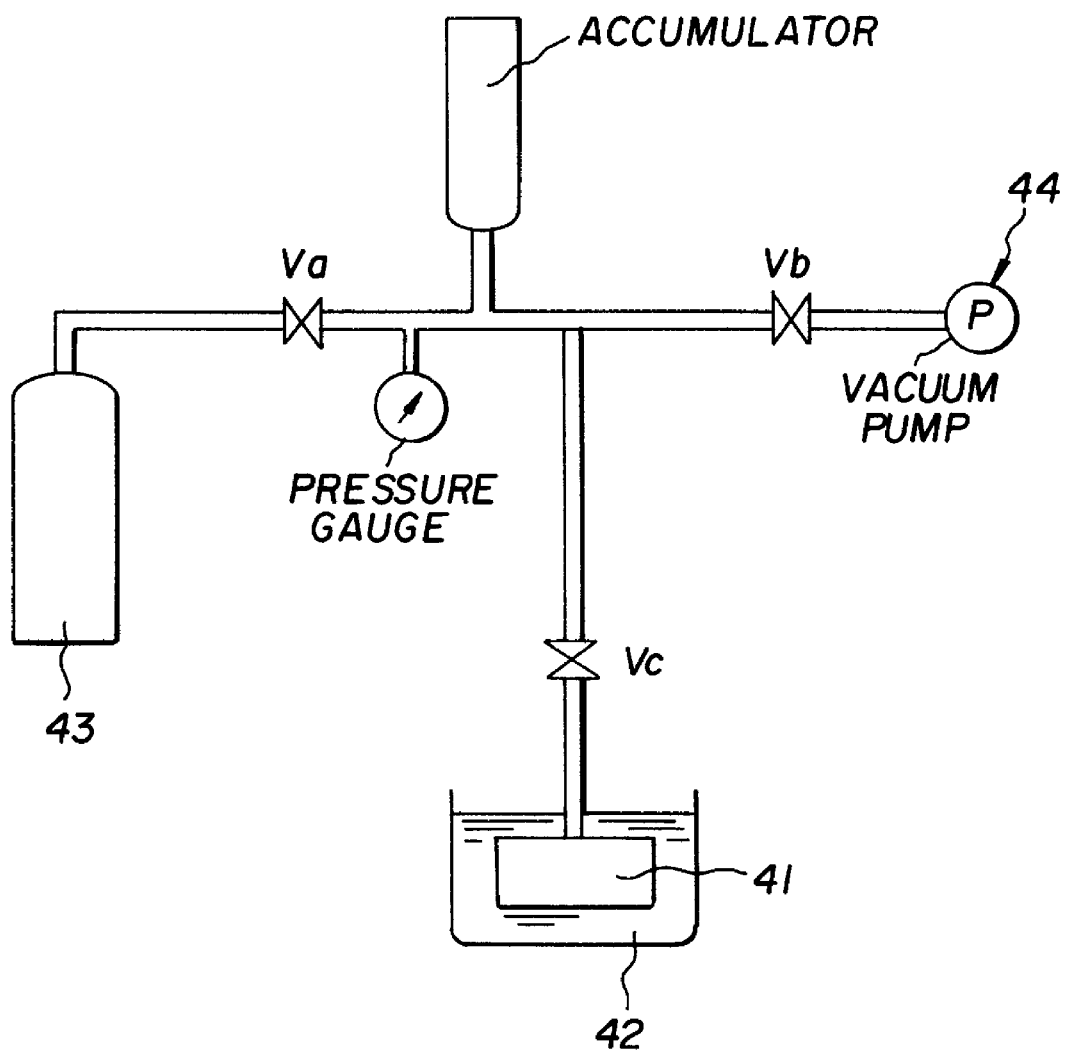
FIG. 4 is a schematic explanatory view of the apparatus for use in measuring the hydrogen absorption and desorption speeds of the hydrogen occluding alloy.

Then, the hydrogen absorption speed and the hydrogen desorption speed of each of the alloy samples 1 to 156 according to the present invention and the conventional alloys are measured in accordance with the "Method of Measuring Hydrogen Absorption Speed Test for Hydrogen Occluding Alloy" per JIS.H7202. The ingots are coarsely crushed to have diameters smaller than 2 mm by using a jaw crusher. Then, the coarse particles are enclosed in a pressure container so as to be subjected to hydrogen decrepitation consisting of: hydrogen absorption under conditions in which there is a hydrogen atmosphere at a pressure of 8 atm., and a temperature of 200° C. maintained for a period of one hour; and hydrogen desorption by evacuation. Thus, the particle size is made to be 200 mesh or smaller. As a result, hydrogen occluding alloy samples 1 to 156 according to the present invention (hereinafter called "alloy according to the present invention") are manufactured. Initially, the hydrogen absorption speed is, as illustrated in a schematic explanatory view shown in FIG. 4, measured such that:

(a) Powder particles (hereinafter called "powder") are enclosed in a container 41 immersed in a (oil or water) bath 42, then a valve Vb is closed and valves Va and Vc are opened in a state where the temperature in the bath is maintained at 200° C. so that pressurized hydrogen is introduced into the system from a hydrogen cylinder 43. When the pressure in the system is raised to 30 atm., the valve Va is closed, followed by allowing the system to stand until the pressure in the system is lowered to a predetermined level (until absorption of hydrogen by means of powder is completed). Thus, powder is initially activated.

(b) When the pressure in the system has been lowered to a predetermined level (about 20 atm.), the valve Vb is opened, followed by lowering the pressure in the system to $10^{-2}$ Torr by a vacuum pump 44. Then, the temperature in the bath is lowered to 20° C., and then the valves Vb and Vc are closed and the valve Va is opened so that hydrogen is introduced into the system (except the container). When the pressure is raised to 30 atm., the valve Va is closed and the valve Vc is opened. In the foregoing state, the pressure drop in the system with respect to time is measured. The quantity of occluded hydrogen at the point when the quantity of hydrogen occluded by powder reaches 80%, and time taken to the foregoing moment are obtained from the pressure-drop curve so that (the quantity of occluded hydrogen when the occlusion of 80% is realized)/(the time taken to realize the occlusion of 80%) is calculated. The thus-obtained values are defined as the hydrogen absorption speeds. The results are shown in Tables 2, 4, 6, 8, 10, 12, 14, 16, 18, 20, 22 and 24.

The hydrogen desorption speed is measured such that: in a state where the measurement of the hydrogen absorption speed had been completed, that is, in a state where the valves Va and Vb are closed and the valve Vc is opened and the pressure in the system has been lowered to a predetermined level (usually about 20 atm.), the temperature in the bath 42 is raised to an appropriate level ranging from 100° C. to 300° C., for example, 120° C., for desorbing hydrogen. Then, the valve Vb is opened and the valve Vc is closed, and in the foregoing state, the pressure in the system except the container 41 is evacuated to $10^{-2}$ Torr. Then, the valve Vb is closed and the valve Vc is opened, and in this state, the pressure rise in the system with respect to time is measured. The quantity of desorbed hydrogen at the point when the quantity of hydrogen desorbed from powder reaches 80%, and time taken to the foregoing moment are obtained from the pressure-rise curve so that (the quantity of desorbed hydrogen when the desorption of 80% is realized)/(the time taken to realize the desorption of 80%) is calculated. The thus-obtained values are defined as the hydrogen desorption speeds. The results are shown in Tables 2, 4, 6, 8, 10, 12, 14, 16, 18, 20, 22 and 24.

Each of alloys 1 to 156 according to the present invention and the conventional alloy are powdered and included as activation material in a battery to evaluate the initial activation as will be described in detail. Charging and discharging of the battery are repeated until the battery has the maximum discharge capacity to measure the number of charging and discharging operations when a discharge capacity corresponding to 95±1% of the foregoing maximum discharge capacity is attained.

That is, each of alloys 1 to 156 according to the present invention and the conventional alloy are coarsely crushed by using a jaw crusher to have a coarse level diameter of 2 mm or smaller. Then, a ball mill is used to finely crush the coarse powder to have a particle size of 200 mesh or smaller, followed by adding water, polytetrafluoroethylene (PTFE) serving as a binding agent and carboxymethylcellulose (CMC) serving as a thickener so that each sample is formed into a paste form. Then, a porous Ni sintered plate (available commercially) and having a porosity of 95% is filled with the foregoing paste material, followed by being dried and compressed to be formed into a shape having a planar dimension of 30 mm×40 mm and a thickness of 0.40 mm to 0.43 mm (the quantity of the contained foregoing activating powder is about 1.8 g). Then, a Ni thin plate to be formed into a lead is welded to one of the sides of the thus-formed structure so that a negative electrode is formed. On the other hand, a positive electrode is manufactured by using $Ni(OH)_2$ and CoO serving as active materials blended at a weight ratio of 84:16, followed by adding water, polytetrafluoroethylene (PTFE) serving as a binding agent and carboxymethylcellulose (CMC) serving as a thickener so as to be formed into paste. Then, the foregoing porous Ni sintered plate is filled with the thus-obtained paste, followed by being dried and compressed. Thus, a structure having a planar dimension of 30 mm×40 mm and a thickness of 0.71 to 0.73 mm is formed, followed by similarly attaching a Ni thin plate to one side of the structure. Then, the foregoing positive electrodes are disposed on the two sides of the negative electrodes through polypropylene polyethylene copolymer separator plates. Then, separation of the active material from the outer surfaces of the positive electrodes is prevented by integrally forming the structure while a vinyl chloride protective plate is interposed. The structure thus having the integrated shape is inserted into a PVC cell, followed by injecting 35% KOH solution serving as electrolyte so that a battery is manufactured.

Then, the battery is charged and discharged under conditions that the charging speed is 0.20 C, discharging speed is 0.16 C and an electricity consumed to charge the battery is 135% of the capacity of the negative electrode. One successive operation of the above-mentioned charging and the above-mentioned discharging is counted as one charge and discharge cycle. The charging and discharging are repeated until the battery has the maximum discharge capacity.

Tables 2, 4, 6, 8, 10, 12, 14, 16, 18, 20, 22 and 24 show the measured maximum discharge capacity of each sample and the number of charge and discharge cycles required to have the discharge capacity which is 95±1% of the maximum discharge capacity. Thus, the initial activation is evaluated.

As can be understood from results shown in Tables 2, 4, 6, 8, 10, 12, 14, 16, 18, 20, 22 and 24, each of the samples 1 to 156 according to the present invention causes hydrogen to be absorbed through the dispersed granular phase (exhibiting significantly high-speed hydrogen absorption), followed by being dissociated, thus causing hydrogen to be rapidly moved to the net-shaped continuous phase. Thus, diffusion of hydrogen into the main phase in the net-shaped continuous phase is performed due to interface diffusion through the foregoing net-shaped continuous phase and the dispersed granular phase. Therefore, hydrogen can be absorbed at high speed. Also, desorption of hydrogen is performed such that hydrogen occluded in the main phase in the net-shaped continuous phase is moved to the foregoing net-shaped continuous phase and the dispersed granular phase. Hydrogen, that has been moved to the net-shaped continuous phase, is immediately diffused to the dispersed granular phase so that it is recombined, followed by being desorbed to the atmosphere. Therefore, hydrogen can be desorbed at high speed. As contrasted with this, although the conventional alloy causes absorption and desorption of hydrogen to be performed through the dispersed granular phase made of the La—Ni type alloy having the same characteristics as those of the foregoing dispersed granular phase, diffusion of hydrogen is performed mainly between the dispersed granular phase and the main phase. Therefore, the hydrogen absorption speed and desorption speed are inevitably lowered relatively.

As described above, the hydrogen occluding alloy and the electrode according to the present invention exhibit significantly high hydrogen absorption and desorption speeds. Consequently, a significant contribution can be made to higher performance of any apparatus employing the hydrogen occluding alloy.

TABLE 1

| Sample No. | Component Composition (wt %) | | | | | | |
|---|---|---|---|---|---|---|---|
| | Zr | Ti | Mn | V | La | Ce | Ni + impurity |
| 1 | 26.1 | 6.2 | 15.9 | 4.8 | 1.6 | 1.7 | BAL. |
| 2 | 34.5 | 5.9 | 16.3 | 5.1 | 3.3 | — | BAL. |
| 3 | 36.8 | 5.9 | 16.4 | 4.7 | 1.2 | 2.4 | BAL. |
| 4 | 33.7 | 5.1 | 16.1 | 4.8 | 3.6 | — | BAL. |
| 5 | 34.2 | 10.6 | 16.4 | 5.0 | — | 3.2 | BAL. |
| 6 | 33.9 | 6.0 | 10.3 | 5.2 | 3.4 | — | BAL. |
| 7 | 34.1 | 5.9 | 19.6 | 5.0 | 3.5 | — | BAL. |
| 8 | 33.6 | 6.1 | 16.1 | 5.8 | 1.4 | 0.9 | BAL. |
| 9 | 34.2 | 5.9 | 16.2 | 4.9 | 1.8 | — | BAL. |
| 10 | 34.3 | 5.7 | 16.2 | 4.8 | — | 2.3 | BAL. |
| 11 | 34.5 | 6.2 | 16.0 | 4.9 | 0.64 | 0.79 | BAL. |
| Comparative-1 | 21.9 | 12.8 | 24.6 | — | 3.8 | Cr: 23.4 | BAL. |

BAL. = Balance

TABLE 2

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 1 | 0.15 | 0.15 | 390 | 4 |
| 2 | 0.18 | 0.18 | 401 | 4 |
| 3 | 0.18 | 0.18 | 405 | 2 |
| 4 | 0.17 | 0.17 | 409 | 2 |
| 5 | 0.16 | 0.16 | 408 | 3 |
| 6 | 0.15 | 0.15 | 404 | 3 |

TABLE 2-continued

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 7 | 0.15 | 0.15 | 406 | 3 |
| 8 | 0.17 | 0.17 | 406 | 3 |
| 9 | 0.17 | 0.17 | 412 | 4 |
| 10 | 0.17 | 0.17 | 411 | 3 |
| 11 | 0.15 | 0.15 | 414 | 2 |
| Comparative-1 | 0.07 | 0.07 | 355 | 19 |

TABLE 3

| Sample No. | Component Composition (wt %) | | | | | | |
|---|---|---|---|---|---|---|---|
| | Zr | Ti | Mn | V | La | Ce | Ni + impurity |
| 12 | 30.3 | 6.1 | 16.2 | 5.2 | 1.7 | 1.7 | BAL. |
| 13 | 34.5 | 5.9 | 16.3 | 5.1 | 3.3 | — | BAL. |
| 14 | 33.7 | 5.1 | 16.1 | 4.8 | 3.6 | — | BAL. |
| 15 | 34.1 | 7.6 | 16.4 | 4.8 | — | 3.0 | BAL. |
| 16 | 34.0 | 9.2 | 16.2 | 4.9 | 2.8 | — | BAL. |
| 17 | 34.1 | 12.0 | 16.8 | 5.2 | 0.5 | 3.0 | BAL. |
| 18 | 34.4 | 14.7 | 15.2 | 5.1 | 1.9 | 1.1 | BAL. |
| 19 | 34.5 | 6.0 | 10.2 | 5.0 | 3.3 | — | BAL. |
| 20 | 34.2 | 6.2 | 12.5 | 5.0 | 3.2 | — | BAL. |
| 21 | 34.1 | 5.9 | 19.6 | 5.0 | 3.5 | — | BAL. |
| 22 | 33.6 | 6.1 | 16.1 | 5.8 | 1.4 | 0.9 | BAL. |
| 23 | 34.2 | 5.9 | 16.2 | 4.9 | 1.8 | — | BAL. |
| 24 | 34.8 | 6.0 | 15.9 | 5.1 | — | 0.91 | BAL. |

TABLE 4

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 12 | 0.17 | 0.16 | 401 | 4 |
| 13 | 0.18 | 0.18 | 409 | 3 |
| 14 | 0.18 | 0.17 | 409 | 2 |
| 15 | 0.18 | 0.17 | 410 | 3 |
| 16 | 0.17 | 0.16 | 411 | 3 |
| 17 | 0.16 | 0.15 | 413 | 2 |
| 18 | 0.17 | 0.16 | 414 | 2 |
| 19 | 0.17 | 0.17 | 403 | 3 |
| 20 | 0.18 | 0.18 | 409 | 3 |
| 21 | 0.18 | 0.17 | 406 | 3 |
| 22 | 0.18 | 0.17 | 406 | 3 |
| 23 | 0.17 | 0.17 | 412 | 4 |
| 24 | 0.13 | 0.13 | 416 | 4 |

TABLE 5

| Sample No. | Component Composition (wt %) | | | | | | | |
|---|---|---|---|---|---|---|---|---|
| | Zr | Ti | Mn | V | La | Ce | Hf | Ni + impurity |
| 25 | 34.3 | 5.7 | 16.2 | 4.8 | — | 2.3 | — | BAL. |
| 26 | 34.5 | 6.2 | 16.0 | 4.9 | 0.64 | 0.79 | — | BAL. |
| Comparative-2 | 21.9 | 12.8 | 24.6 | — | 3.8 | Cr: 23.4 | — | BAL. |
| 27 | 25.9 | 5.8 | 16.1 | 4.8 | 1.7 | 1.6 | 1.4 | BAL. |
| 28 | 29.8 | 6.1 | 16.1 | 4.9 | 1.7 | 1.8 | 1.5 | BAL. |
| 29 | 34.2 | 5.8 | 15.9 | 5.1 | 3.4 | — | 1.5 | BAL. |
| 30 | 36.9 | 6.1 | 16.3 | 4.8 | 1.0 | 2.6 | 1.4 | BAL. |
| 31 | 34.3 | 10.3 | 15.8 | 4.8 | 2.9 | — | 1.4 | BAL. |
| 32 | 34.3 | 5.7 | 10.7 | 5.2 | 3.5 | — | 1.4 | BAL. |
| 33 | 34.2 | 5.9 | 19.2 | 5.1 | 1.9 | 1.5 | 1.4 | BAL. |
| 34 | 34.3 | 5.9 | 16.1 | 5.9 | 1.5 | 1.6 | 1.3 | BAL. |

TABLE 5-continued

| Sample No. | Zr | Ti | Mn | V | La | Ce | Hf | Ni + impurity |
|---|---|---|---|---|---|---|---|---|
| | | | Component Composition (wt %) | | | | | |
| 35 | 34.6 | 5.8 | 15.7 | 4.7 | 1.9 | — | 1.3 | BAL. |
| 36 | 33.9 | 6.1 | 16.0 | 4.9 | — | 0.62 | 1.1 | BAL. |

TABLE 6

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 25 | 0.17 | 0.17 | 411 | 3 |
| 26 | 0.15 | 0.15 | 414 | 2 |
| Comparative-2 | 0.07 | 0.07 | 355 | 19 |
| 27 | 0.14 | 0.15 | 390 | 5 |
| 28 | 0.16 | 0.17 | 399 | 4 |
| 29 | 0.18 | 0.18 | 405 | 3 |
| 30 | 0.19 | 0.18 | 404 | 2 |
| 31 | 0.17 | 0.17 | 414 | 3 |
| 32 | 0.18 | 0.18 | 407 | 2 |
| 33 | 0.17 | 0.18 | 406 | 3 |
| 34 | 0.18 | 0.17 | 407 | 4 |
| 35 | 0.17 | 0.17 | 413 | 4 |
| 36 | 0.13 | 0.14 | 417 | 5 |

TABLE 7

| Sample No. | Zr | Ti | Mn | V | La | Ce | Hf | Ni + impurity |
|---|---|---|---|---|---|---|---|---|
| | | | Component Composition (wt %) | | | | | |
| 37 | 34.7 | 6.2 | 16.2 | 5.1 | — | 1.4 | 1.0 | BAL. |
| 38 | 34.5 | 6.1 | 16.3 | 4.9 | 0.81 | 1.2 | 0.11 | BAL. |
| 39 | 34.3 | 5.9 | 15.9 | 5.1 | 3.2 | — | 0.11 | BAL. |
| 40 | 34.7 | 5.8 | 16.1 | 5.2 | — | 2.9 | 0.62 | BAL. |
| 41 | 34.2 | 6.1 | 16.2 | 4.9 | 1.5 | 1.6 | 0.53 | BAL. |
| 42 | 34.9 | 6.2 | 16.0 | 4.8 | 3.1 | — | 1.9 | BAL. |
| Comparative-3 | 21.8 | 12.5 | 25.0 | Cr: 23.1 | 3.9 | — | — | BAL. |
| 43 | 25.1 | 5.9 | 16.1 | 5.2 | 1.8 | 1.5 | — | BAL. |
| 44 | 29.8 | 6.0 | 16.1 | 5.1 | 3.0 | — | — | BAL. |
| 45 | 34.9 | 6.1 | 16.0 | 4.8 | 1.8 | 1.5 | — | BAL. |
| 46 | 36.6 | 6.0 | 16.2 | 4.8 | — | 3.2 | — | BAL. |
| 47 | 40.8 | 6.1 | 15.9 | 4.9 | — | 3.3 | — | BAL. |
| 48 | 44.2 | 6.1 | 16.1 | 5.2 | 3.2 | — | — | BAL. |
| 49 | 34.3 | 1.1 | 16.2 | 5.0 | 3.2 | — | — | BAL. |
| 50 | 34.4 | 4.3 | 16.1 | 4.9 | 1.7 | 1.4 | — | BAL. |
| 51 | 34.4 | 11.1 | 16.0 | 5.2 | 3.1 | — | — | BAL. |

TABLE 8

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 37 | 0.17 | 0.18 | 410 | 3 |
| 38 | 0.15 | 0.15 | 410 | 3 |
| 39 | 0.18 | 0.17 | 404 | 2 |
| 40 | 0.17 | 0.17 | 407 | 3 |
| 41 | 0.18 | 0.18 | 406 | 2 |
| 42 | 0.17 | 0.18 | 405 | 2 |
| Comparative-3 | 0.07 | 0.08 | 362 | 18 |
| 43 | 0.16 | 0.16 | 391 | 4 |
| 44 | 0.17 | 0.17 | 400 | 4 |
| 45 | 0.18 | 0.18 | 403 | 3 |
| 46 | 0.19 | 0.18 | 406 | 3 |
| 47 | 0.19 | 0.19 | 403 | 2 |
| 48 | 0.19 | 0.18 | 402 | 2 |
| 49 | 0.18 | 0.17 | 400 | 2 |
| 50 | 0.18 | 0.19 | 402 | 3 |
| 51 | 0.16 | 0.16 | 411 | 2 |

TABLE 9

| Sample No. | Component Composition (wt %) | | | | | | |
|---|---|---|---|---|---|---|---|
| | Zr | Ti | Mn | V | La | Ce | Ni + impurity |
| 52 | 34.3 | 5.9 | 10.3 | 4.8 | — | 3.2 | BAL. |
| 53 | 34.5 | 6.1 | 18.0 | 5.0 | 2.9 | — | BAL. |
| 54 | 34.3 | 6.1 | 19.7 | 4.9 | 1.7 | 1.4 | BAL. |
| 55 | 34.2 | 5.8 | 15.9 | 2.9 | 1.6 | 1.3 | BAL. |
| 56 | 34.3 | 6.0 | 16.1 | 8.22 | — | 3.3 | BAL. |
| 57 | 34.5 | 6.0 | 16.2 | 11.1 | 3.0 | — | BAL. |
| 58 | 34.4 | 6.1 | 15.9 | 5.9 | 0.37 | 0.36 | BAL. |
| 59 | 34.1 | 5.9 | 16.3 | 4.8 | 0.62 | — | BAL. |
| 60 | 34.5 | 6.1 | 16.0 | 4.8 | 0.63 | 0.51 | BAL. |
| 61 | 34.6 | 5.9 | 15.9 | 4.8 | — | 1.1 | BAL. |
| 62 | 34.5 | 6.0 | 15.8 | 5.2 | 1.2 | 1.01 | BAL. |
| 63 | 34.3 | 6.2 | 15.9 | 5.1 | 2.1 | — | BAL. |
| 64 | 34.5 | 5.8 | 15.9 | 5.1 | 2.6 | 2.1 | BAL. |
| 65 | 34.6 | 6.1 | 15.9 | 5.1 | — | 4.7 | BAL. |
| Comparative-4 | 23.8 | 12.5 | 24.1 | — | 3.8 | Cr: 22.9 | BAL. |

TABLE 10

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 52 | 0.17 | 0.18 | 405 | 3 |
| 53 | 0.19 | 0.19 | 406 | 2 |
| 54 | 0.18 | 0.18 | 405 | 3 |
| 55 | 0.18 | 0.18 | 401 | 3 |
| 56 | 0.18 | 0.18 | 407 | 2 |
| 57 | 0.19 | 0.18 | 403 | 3 |
| 58 | 0.13 | 0.14 | 419 | 5 |
| 59 | 0.13 | 0.13 | 418 | 4 |
| 60 | 0.17 | 0.14 | 413 | 4 |
| 61 | 0.15 | 0.15 | 412 | 3 |
| 62 | 0.17 | 0.17 | 411 | 2 |
| 63 | 0.18 | 0.16 | 410 | 3 |

TABLE 10-continued

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 64 | 0.18 | 0.18 | 401 | 2 |
| 65 | 0.18 | 0.17 | 403 | 2 |
| Comparative-4 | 0.07 | 0.08 | 361 | 18 |

TABLE 11

| Sample No. | Component Composition (wt %) | | | | | | | | | |
|---|---|---|---|---|---|---|---|---|---|---|
| | Zr | Ti | Mn | V | La | Ce | Pr | Nd | Hf | Ni + impurity |
| 66 | 25.1 | 6.1 | 16.2 | 5.3 | 1.6 | 1.3 | — | — | 0.9 | BAL. |
| 67 | 29.8 | 6.0 | 15.9 | 5.3 | 2.9 | — | — | — | 1.1 | BAL. |
| 68 | 34.8 | 6.0 | 15.9 | 4.8 | 1.6 | 1.3 | — | — | 1.0 | BAL. |
| 69 | 36.8 | 6.2 | 16.0 | 5.2 | — | 3.3 | — | — | 1.2 | BAL. |
| 70 | 40.3 | 6.2 | 16.0 | 5.2 | — | 2.9 | — | — | 1.2 | BAL. |
| 71 | 43.9 | 5.9 | 15.9 | 5.0 | 3.1 | — | — | — | 1.0 | BAL. |
| 72 | 34.4 | 1.2 | 16.0 | 4.9 | 3.2 | — | — | — | 1.1 | BAL. |
| 73 | 34.3 | 4.3 | 16.2 | 5.2 | 1.7 | 1.4 | — | — | 1.0 | BAL. |
| 74 | 34.2 | 11.3 | 15.9 | 5.1 | 2.9 | — | — | — | 1.1 | BAL. |
| 75 | 34.5 | 5.9 | 10.4 | 5.1 | — | 3.2 | — | — | 1.1 | BAL. |
| 76 | 34.5 | 5.9 | 17.9 | 5.1 | 3.0 | — | — | — | 1.2 | BAL. |
| 77 | 34.5 | 5.9 | 19.7 | 5.0 | 1.8 | 1.5 | — | — | 0.9 | BAL. |
| 78 | 34.5 | 6.0 | 16.2 | 3.1 | 1.6 | 1.3 | — | — | 1.0 | BAL. |
| 79 | 34.6 | 6.0 | 16.2 | 8.2 | — | 3.0 | — | — | 0.9 | BAL. |
| 80 | 34.6 | 6.0 | 16.2 | 11.1 | 3.0 | — | — | — | 1.0 | BAL. |

TABLE 12

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 66 | 0.16 | 0.15 | 391 | 4 |
| 67 | 0.16 | 0.15 | 398 | 4 |
| 68 | 0.19 | 0.17 | 404 | 2 |
| 69 | 0.18 | 0.18 | 405 | 3 |
| 70 | 0.19 | 0.18 | 404 | 3 |
| 71 | 0.19 | 0.19 | 403 | 3 |
| 72 | 0.17 | 0.18 | 402 | 2 |
| 73 | 0.18 | 0.18 | 404 | 2 |
| 74 | 0.16 | 0.16 | 412 | 3 |
| 75 | 0.19 | 0.17 | 402 | 3 |
| 76 | 0.19 | 0.18 | 406 | 3 |
| 77 | 0.17 | 0.17 | 404 | 3 |
| 78 | 0.17 | 0.17 | 401 | 2 |
| 79 | 0.18 | 0.17 | 402 | 2 |
| 80 | 0.16 | 0.17 | 405 | 3 |

TABLE 13

| Sample No. | Component Composition (wt %) |  |  |  |  |  |  |  |  | Ni + impurity |
|---|---|---|---|---|---|---|---|---|---|---|
|  | Zr | Ti | Mn | V | La | Ce | Pr | Nd | Hf |  |
|  |  |  |  |  | Rare Earth | | | | | |
| 81 | 34.7 | 6.1 | 15.9 | 5.1 | 0.07 | 0.05 | — | — | 1.0 | BAL. |
| 82 | 34.2 | 5.9 | 16.1 | 4.8 | 0.12 | — | — | — | 1.0 | BAL. |
| 83 | 34.6 | 5.9 | 16.0 | 5.3 | 0.55 | 0.45 | — | — | 1.0 | BAL. |
| 84 | 34.2 | 5.9 | 15.8 | 4.9 | — | 0.91 | — | — | 0.9 | BAL. |
| 85 | 34.2 | 6.1 | 15.9 | 5.1 | 1.1 | 0.95 | — | — | 1.0 | BAL. |
| 86 | 34.5 | 6.1 | 16.0 | 5.2 | 2.3 | — | — | — | 1.2 | BAL. |
| 87 | 34.4 | 5.8 | 15.9 | 4.8 | 2.6 | 2.2 | — | — | 1.1 | BAL. |
| 88 | 34.6 | 5.8 | 15.9 | 4.9 | — | 4.8 | — | — | 1.1 | BAL. |
| 89 | 34.2 | 5.8 | 15.8 | 4.8 | 1.6 | 1.3 | — | — | 0.1 | BAL. |
| 90 | 34.2 | 5.8 | 15.8 | 4.8 | 2.9 | — | — | — | 1.7 | BAL. |
| 91 | 34.2 | 5.8 | 15.8 | 4.8 | 1.6 | 1.3 | — | — | 2.7 | BAL. |
| 92 | 34.3 | 5.8 | 16.1 | 5.0 | — | 3.1 | — | — | 3.8 | BAL. |
| 93 | 34.3 | 6.1 | 15.9 | 5.3 | 0.13 | 0.27 | 0.11 | 0.12 | 1.1 | BAL. |
| 94 | 34.6 | 5.9 | 16.0 | 5.2 | 0.25 | 0.24 | 0.23 | — | 1.0 | BAL. |
| 95 | 34.3 | 6.1 | 16.1 | 5.0 | 0.37 | — | 0.26 | — | 1.0 | BAL. |

TABLE 14

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 81 | 0.13 | 0.13 | 418 | 4 |
| 82 | 0.14 | 0.15 | 417 | 4 |
| 83 | 0.14 | 0.14 | 413 | 3 |
| 84 | 0.15 | 0.15 | 415 | 3 |
| 85 | 0.17 | 0.15 | 411 | 3 |
| 86 | 0.16 | 0.15 | 410 | 3 |
| 87 | 0.19 | 0.18 | 405 | 3 |
| 88 | 0.17 | 0.19 | 404 | 2 |
| 89 | 0.17 | 0.17 | 405 | 2 |
| 90 | 0.17 | 0.17 | 405 | 3 |
| 91 | 0.17 | 0.18 | 404 | 2 |
| 92 | 0.18 | 0.18 | 406 | 3 |
| 93 | 0.14 | 0.15 | 420 | 5 |
| 94 | 0.15 | 0.15 | 417 | 4 |
| 95 | 0.14 | 0.15 | 419 | 5 |

TABLE 15

| Sample No. | Component Composition (wt %) |  |  |  |  |  |  |  |  | Ni + impurity |
|---|---|---|---|---|---|---|---|---|---|---|
|  | Zr | Ti | Mn | V | La | Ce | Pr | Nd | Hf |  |
|  |  |  |  |  | Rare Earth | | | | | |
| 96 | 34.5 | 6.1 | 16.1 | 5.3 | 0.49 | 0.05 | 0.11 | 0.44 | 1.1 | BAL. |
| 97 | 34.3 | 6.2 | 16.1 | 4.8 | 0.33 | 0.24 | — | 0.38 | 1.0 | BAL. |
| 98 | 34.3 | 5.8 | 15.9 | 5.1 | 0.53 | — | — | 0.43 | 1.0 | BAL. |
| 99 | 34.3 | 6.1 | 15.9 | 4.8 | 1.3 | 0.14 | 0.45 | 0.14 | 1.0 | BAL. |
| 100 | 34.2 | 6.2 | 15.8 | 5.1 | 0.41 | — | 0.81 | 0.71 | 0.9 | BAL. |
| 101 | 34.6 | 6.0 | 16.2 | 5.2 | — | 1.6 | 0.57 | — | 1.1 | BAL. |
| 102 | 34.2 | 6.1 | 16.2 | 5.2 | 3.7 | 0.09 | 0.23 | 0.47 | 1.0 | BAL. |
| 103 | 34.6 | 6.0 | 16.0 | 5.1 | — | 1.9 | 1.7 | 1.2 | 1.2 | BAL. |
| 104 | 34.2 | 5.9 | 15.9 | 5.1 | — | 2.7 | — | 2.2 | 1.2 | BAL. |
| 105 | 25.1 | 8.1 | 16.2 | 5.3 | 1.6 | 1.3 | — | — | 0.9 | BAL. |
| 106 | 29.8 | 8.0 | 15.9 | 5.3 | 2.9 | — | — | — | 1.1 | BAL. |
| 107 | 34.8 | 8.0 | 15.9 | 4.8 | 1.6 | 1.3 | — | — | 1.0 | BAL. |
| 108 | 36.8 | 8.2 | 16.0 | 5.2 | — | 3.3 | — | — | 1.2 | BAL. |
| 109 | 40.3 | 8.2 | 16.0 | 5.2 | — | 2.9 | — | — | 1.2 | BAL. |

TABLE 16

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 96 | 0.16 | 0.14 | 415 | 3 |
| 97 | 0.15 | 0.15 | 413 | 3 |
| 98 | 0.15 | 0.14 | 413 | 4 |
| 99 | 0.17 | 0.16 | 411 | 3 |
| 100 | 0.16 | 0.17 | 411 | 3 |
| 101 | 0.15 | 0.16 | 409 | 3 |
| 102 | 0.17 | 0.18 | 402 | 3 |
| 103 | 0.19 | 0.19 | 402 | 2 |
| 104 | 0.17 | 0.18 | 404 | 2 |
| 105 | 0.16 | 0.15 | 391 | 4 |
| 106 | 0.16 | 0.15 | 398 | 4 |
| 107 | 0.19 | 0.17 | 404 | 2 |
| 108 | 0.18 | 0.18 | 405 | 3 |
| 109 | 0.19 | 0.18 | 403 | 3 |

TABLE 17

| Sample No. | Component Composition (wt %) | | | | | | | | | |
|---|---|---|---|---|---|---|---|---|---|---|
| | | | | | Rare Earth | | | | | Ni+ |
| | Zr | Ti | Mn | V | La | Ce | Pr | Nd | Hf | impurity |
| 110 | 43.9 | 7.9 | 15.9 | 5.0 | 3.1 | — | — | — | 1.0 | BAL. |
| 111 | 34.4 | 3.2 | 16.0 | 4.9 | 3.2 | — | — | — | 1.1 | BAL. |
| 112 | 34.3 | 6.3 | 16.2 | 5.2 | 1.7 | 1.4 | — | — | 1.0 | BAL. |
| 113 | 34.2 | 13.3 | 15.9 | 5.1 | 2.9 | — | — | — | 1.1 | BAL. |
| 114 | 34.5 | 7.9 | 10.4 | 5.1 | — | 3.2 | — | — | 1.1 | BAL. |
| 115 | 34.5 | 7.9 | 17.9 | 5.1 | 3.0 | — | — | — | 1.2 | BAL. |
| 116 | 34.5 | 7.9 | 19.7 | 5.0 | 1.8 | 1.5 | — | — | 0.9 | BAL. |
| 117 | 34.5 | 8.0 | 16.2 | 3.1 | 1.6 | 1.3 | — | — | 1.0 | BAL. |
| 118 | 34.6 | 8.0 | 16.2 | 8.2 | — | 3.0 | — | — | 0.9 | BAL. |
| 119 | 34.6 | 8.0 | 16.2 | 11.1 | 3.0 | — | — | — | 1.0 | BAL. |
| 120 | 34.6 | 7.9 | 16.0 | 5.3 | 0.55 | 0.45 | — | — | 1.0 | BAL. |
| 121 | 34.2 | 7.9 | 15.8 | 4.9 | — | 0.91 | — | — | 0.9 | BAL. |
| 122 | 34.2 | 8.1 | 15.9 | 5.1 | 1.1 | 0.95 | — | — | 1.0 | BAL. |

TABLE 18

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 110 | 0.19 | 0.19 | 402 | 3 |
| 111 | 0.17 | 0.18 | 401 | 3 |
| 112 | 0.16 | 0.18 | 404 | 2 |
| 113 | 0.15 | 0.15 | 412 | 3 |
| 114 | 0.19 | 0.17 | 402 | 3 |
| 115 | 0.19 | 0.18 | 406 | 3 |
| 116 | 0.17 | 0.17 | 404 | 3 |
| 117 | 0.17 | 0.17 | 401 | 2 |
| 118 | 0.18 | 0.17 | 406 | 2 |
| 119 | 0.16 | 0.17 | 402 | 3 |
| 120 | 0.14 | 0.14 | 413 | 3 |
| 121 | 0.15 | 0.15 | 415 | 3 |
| 122 | 0.17 | 0.15 | 411 | 3 |

TABLE 19

| Sample No. | Component Composition (wt %) | | | | | | | | | |
|---|---|---|---|---|---|---|---|---|---|---|
| | | | | | Rare Earth | | | | | Ni+ |
| | Zr | Ti | Mn | V | La | Ce | Pr | Nd | Hf | impurity |
| 123 | 34.5 | 8.1 | 16.0 | 5.2 | 2.3 | — | — | — | 1.2 | BAL. |
| 124 | 34.4 | 7.8 | 15.9 | 4.8 | 2.6 | 2.2 | — | — | 1.1 | BAL. |
| 125 | 34.6 | 7.8 | 15.9 | 4.9 | — | 4.8 | — | — | 1.1 | BAL. |
| 126 | 34.2 | 7.8 | 15.8 | 4.8 | 1.6 | 1.3 | — | — | 0.1 | BAL. |
| 127 | 34.2 | 7.8 | 15.8 | 4.8 | 2.9 | — | — | — | 1.7 | BAL. |
| 128 | 34.2 | 7.8 | 15.8 | 4.8 | 1.6 | 1.3 | — | — | 2.7 | BAL. |
| 129 | 34.3 | 7.8 | 16.1 | 5.0 | — | 3.1 | — | — | 3.8 | BAL. |
| 130 | 34.5 | 8.1 | 16.1 | 5.3 | 0.49 | 0.05 | 0.11 | 0.44 | 1.1 | BAL. |
| 131 | 34.3 | 8.2 | 16.1 | 4.8 | 0.33 | 0.24 | — | 0.38 | 1.0 | BAL. |
| 132 | 34.3 | 7.8 | 15.9 | 5.1 | 0.53 | — | — | 0.43 | 1.0 | BAL. |
| 133 | 34.3 | 8.1 | 15.9 | 4.8 | 1.3 | 0.14 | 0.45 | 0.14 | 1.0 | BAL. |
| 134 | 34.2 | 8.2 | 15.8 | 5.1 | 0.41 | — | 0.81 | 0.71 | 0.9 | BAL. |

TABLE 20

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 123 | 0.16 | 0.15 | 410 | 3 |
| 124 | 0.19 | 0.18 | 401 | 3 |
| 125 | 0.17 | 0.19 | 402 | 2 |
| 126 | 0.18 | 0.18 | 403 | 2 |
| 127 | 0.17 | 0.18 | 405 | 2 |
| 128 | 0.18 | 0.17 | 403 | 2 |
| 129 | 0.18 | 0.18 | 402 | 3 |
| 130 | 0.16 | 0.14 | 415 | 3 |
| 131 | 0.15 | 0.15 | 413 | 3 |
| 132 | 0.15 | 0.14 | 413 | 4 |
| 133 | 0.17 | 0.16 | 411 | 3 |
| 134 | 0.16 | 0.17 | 411 | 3 |

TABLE 21

| Sample No. | Component Composition (wt %) | | | | | | | | | |
|---|---|---|---|---|---|---|---|---|---|---|
| | | | | | Rare Earth | | | | | Ni+ |
| | Zr | Ti | Mn | V | La | Ce | Pr | Nd | Hf | impurity |
| 135 | 34.6 | 8.0 | 16.2 | 5.2 | — | 1.6 | 0.57 | — | 1.1 | BAL. |
| 136 | 34.2 | 8.1 | 16.2 | 5.2 | 3.7 | 0.09 | 0.23 | 0.47 | 1.0 | BAL. |
| 137 | 34.6 | 8.0 | 16.0 | 5.1 | — | 1.9 | 1.7 | — | 1.2 | BAL. |
| 138 | 34.2 | 7.9 | 15.9 | 5.1 | — | 2.7 | — | 2.2 | 1.2 | BAL. |
| 139 | 43.9 | 7.3 | 15.2 | 4.8 | 2.8 | — | — | — | 0.9 | BAL. |
| 140 | 34.6 | 8.0 | 16.0 | 5.1 | — | 1.95 | 1.7 | 1.22 | 1.2 | BAL. |
| 141 | 34.3 | 6.1 | 19.7 | 4.9 | 1.7 | 1.4 | — | — | — | BAL. |
| 142 | 34.5 | 6.0 | 16.2 | 11.1 | 3.0 | — | — | — | — | BAL. |
| 143 | 34.8 | 8.0 | 15.9 | 4.8 | 1.6 | 1.3 | — | — | 1.0 | BAL. |
| 144 | 34.3 | 6.3 | 16.2 | 5.2 | 1.7 | 1.4 | — | — | 1.0 | BAL. |
| 145 | 34.5 | 7.9 | 10.4 | 5.1 | — | 3.2 | — | — | 1.1 | BAL. |
| 146 | 34.5 | 7.9 | 17.9 | 5.1 | 3.0 | — | — | — | 1.2 | BAL. |
| 147 | 34.6 | 8.0 | 16.2 | 11.1 | 3.0 | — | — | — | 1.0 | BAL. |
| 148 | 34.3 | 7.8 | 16.1 | 5.0 | — | 3.1 | — | — | 3.8 | BAL. |

TABLE 22

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 135 | 0.15 | 0.15 | 409 | 3 |
| 136 | 0.19 | 0.19 | 402 | 3 |
| 137 | 0.15 | 0.16 | 402 | 3 |
| 138 | 0.16 | 0.16 | 404 | 3 |
| 139 | 0.19 | 0.19 | 400 | 3 |
| 140 | 0.15 | 0.15 | 402 | 3 |
| 141 | 0.18 | 0.17 | 404 | 2 |
| 142 | 0.18 | 0.18 | 403 | 3 |
| 143 | 0.18 | 0.18 | 406 | 2 |
| 144 | 0.18 | 0.18 | 404 | 2 |
| 145 | 0.18 | 0.17 | 402 | 3 |
| 146 | 0.18 | 0.18 | 406 | 3 |
| 147 | 0.18 | 0.17 | 402 | 3 |
| 148 | 0.18 | 0.18 | 403 | 3 |

TABLE 23

(For No Homogenization)

| | Component Composition (wt %) | | | | | | | | |
|---|---|---|---|---|---|---|---|---|---|
| | | | | | Rare Earth | | | | Ni+ |
| Sample No. | Zr | Ti | Mn | V | La | Ce | Pr | Nd | Hf | impurity |
| 149 | 34.5 | 6.0 | 16.2 | 5.0 | 3.5 | — | — | — | — | BAL. |
| 150 | 34.9 | 5.9 | 16.0 | 8.1 | 1.8 | 1.6 | — | — | — | BAL. |
| 151 | 34.7 | 5.8 | 15.9 | 5.2 | 3.3 | — | — | — | 1.3 | BAL. |
| 152 | 34.3 | 6.1 | 16.2 | 8.0 | 1.7 | 1.6 | — | — | 1.2 | BAL. |
| 153 | 34.0 | 5.8 | 15.9 | 5.0 | 1.1 | 1.2 | 1.1 | — | — | BAL. |
| 154 | 33.9 | 6.1 | 16.1 | 7.9 | 1.5 | 0.6 | — | 0.9 | — | BAL. |
| 155 | 34.3 | 5.9 | 16.1 | 5.1 | 1.6 | — | 0.8 | 0.7 | 1.1 | BAL. |
| 156 | 34.2 | 5.9 | 16.0 | 8.0 | — | 0.9 | 1.3 | 0.8 | 1.2 | BAL. |

BAL. = Balance

TABLE 24

(For No Homogenization)

| Sample No. | Hydrogen Absorption Speed (wt %/SEC) | Hydrogen Desorption Speed (wt %/SEC) | Electric Discharge Capacity (mAh/g) | Electric Charge and Discharge Cycles (time) |
|---|---|---|---|---|
| 149 | 0.18 | 0.17 | 407 | 2 |
| 150 | 0.18 | 0.17 | 405 | 2 |
| 151 | 0.17 | 0.18 | 406 | 2 |
| 152 | 0.18 | 0.18 | 406 | 2 |
| 153 | 0.15 | 0.16 | 407 | 2 |
| 154 | 0.16 | 0.15 | 406 | 2 |
| 155 | 0.16 | 0.17 | 406 | 2 |
| 156 | 0.15 | 0.15 | 405 | 3 | wt %/SEC = Weight %/Second

We claim:

1. A hydrogen occluding alloy comprising:
   25 to 45 weight % Zr, 1 to 15 weight % Ti,
   10 to 20 weight % Mn, 2 to 12 weight % V,
   0.6 to 5 weight % elemental rare earth,
   unavoidable impurities,
   and at least 25 weight % Ni,
   said alloy comprising at least three phases.

2. A hydrogen occluding alloy as recited in claim 1, wherein said alloy consists essentially of said three phases.

3. A hydrogen occluding alloy as recited in claim 1, wherein said three phases comprise:
   (1) a net-shaped continuous phase which is made of a Ni—Zr alloy,
   (2) a main phase in the net-shaped continuous phase, said main phase being made of a Zr—Ni—Mn based alloy, and
   (3) a dispersed granular phase made of a rare earth elements-Ni alloy, distributed along the net-shaped continuous phase.

4. A hydrogen occluding alloy as recited in claim 1, wherein said composition consists essentially of:
25 to 45 weight % Zr, 1 to 15 weight % Ti,
10 to 20 weight % Mn, 2 to 12 weight % V,
0.6 to 5 weight % elemental rare earth,
unavoidable impurities,
and the balance Ni,
the amount of Ni being at least 25 weight %.

5. A hydrogen occluding alloy as recited in claim 1, wherein said elemental rare earth comprises at least one member selected from the group consisting of La, Ce, Pr and Nd.

6. A hydrogen occluding alloy as recited in claim 5, wherein said elemental rare earth consists essentially of at least one member selected from the group consisting of La, Ce, Pr and Nd.

7. A hydrogen occluding alloy as recited in claim 6, wherein said elemental rare earth consists essentially of at least one member selected from the group consisting of La and Ce.

8. A hydrogen occluding alloy as recited in claim 1, wherein said alloy comprises:
25 to 37 weight % Zr, 5 to 15 weight % Ti,
10 to 20 weight % Mn, 2 to 6 weight % V,
0.6 to 5 weight % of at least one of La and Ce,
unavoidable impurities,
and the balance Ni,
the amount of Ni being at least 25 weight %.

9. A hydrogen occluding alloy as recited in claim 1, wherein said alloy comprises:
30 to 38 weight % Zr, 4 to 9 weight % Ti,
14 to 18 weight % Mn, 4 to 8 weight % V,
1 to 4 weight % of elemental rare earth,
unavoidable impurities,
and the balance Ni,
the amount of Ni being at least 25 weight %.

10. A hydrogen occluding alloy as recited in claim 1, wherein said alloy comprises:
30 to 37 weight % Zr, 5 to 9 weight % Ti,
14 to 18 weight % Mn, 4 to 6 weight % V,
1 to 4 weight % of at least one of La and Ce,
unavoidable impurities,
and the balance Ni,
the amount of Ni being at least 25 weight %.

11. An electrode for a Ni-hydrogen battery, said electrode comprising a hydrogen occluding alloy as recited in claim 1.

12. A hydrogen occluding alloy comprising three phases, said alloy made by:
(a) preparing an alloy ingot comprising:
25 to 45 weight % Zr, 1 to 15 weight % Ti,
10 to 20 weight % Mn, 2 to 12 weight % V,
0.6 to 5 weight % elemental rare earth,
unavoidable impurities,
and at least 25 weight % Ni,
(b) homogenizing said ingot at a temperature of 950° C. to 1,050° C.;
(c) heat treating said ingot at a temperature of 1,100° C. to 1,200° C.; and
(d) quenching said ingot,
thereby obtaining said alloy comprising at least three phases.

13. A hydrogen occluding alloy as recited in claim 12, wherein said alloy comprises:

25 to 37 weight % Zr, 5 to 15 weight % Ti,
10 to 20 weight % Mn, 2 to 6 weight % V,
0.6 to 5 weight % of at least one of La and Ce,
unavoidable impurities,
and the balance Ni,
the amount of Ni being at least 25 weight %.

14. A hydrogen occluding alloy as recited in claim 12, wherein said alloy comprises:
30 to 38 weight % Zr, 4 to 9 weight % Ti,
14 to 18 weight % Mn, 4 to 8 weight % V,
1 to 4 weight % of elemental rare earth,
unavoidable impurities,
and the balance Ni,
the amount of Ni being at least 25 weight %.

15. A hydrogen occluding alloy as recited in claim 12, wherein said alloy comprises:
30 to 37 weight % Zr, 5 to 9 weight % Ti,
14 to 18 weight % Mn, 4 to 6 weight % V,
1 to 4 weight % of at least one of La and Ce,
unavoidable impurities,
and the balance Ni,
the amount of Ni being at least 25 weight %.

16. A hydrogen occluding alloy comprising three phases, said alloy made by:
(a) preparing an alloy ingot comprising:
25 to 45 weight % Zr, 1 to 15 weight % Ti,
10 to 20 weight % Mn, 2 to 12 weight % V,
0.6 to 5 weight % elemental rare earth,
unavoidable impurities,
and at least 25 weight % Ni,
(b) heat treating said ingot at a temperature of 1,100° C. to 1,200° C.; and
(c) quenching said ingot,
thereby obtaining said alloy comprising at least three phases.

17. A hydrogen occluding alloy comprising:
25 to 45 weight % Zr+Hf, wherein said Hf does not exceed 4 weight %,
1 to 15 weight % Ti,
10 to 20 weight % Mn, 2 to 12 weight % V,
0.6 to 5 weight % elemental rare earth,
unavoidable impurities,
and at least 25 weight % Ni,
said alloy comprising at least three phases.

18. A hydrogen occluding alloy as recited in claim 17, wherein said alloy comprises:
25 to 37 weight % Zr
0.1 to 2 weight % Hf,
5 to 15 weight % Ti,
10 to 20 weight % Mn, 2 to 6 weight % V,
0.6 to 5 weight % of at least one of La and Ce,
unavoidable impurities,
and the balance Ni,
the amount of Ni being at least 25 weight %.

19. A hydrogen occluding alloy as recited in claim 17, wherein said alloy comprises:
30 to 38 weight % Zr+Hf, wherein said Hf does not exceed 2 weight %,
4 to 9 weight % Ti,
14 to 18 weight % Mn, 4 to 8 weight % V,
1 to 4 weight % of elemental rare earth, unavoidable impurities,
and the balance Ni,
the amount of Ni being at least 25 weight %.

20. A hydrogen occluding alloy as recited in claim 17, wherein said alloy comprises:
   30 to 37 weight % Zr,
   0.1 to 2 weight % Hf,
   5 to 9 weight % Ti,
   14 to 18 weight % Mn, 4 to 6 weight % V,
   1 to 4 weight % of at least one of La and Ce,
   unavoidable impurities,
   and the balance Ni,
   the amount of Ni being at least 25 weight %.

21. A hydrogen occluding alloy comprising at least three phases, said alloy being made by a process comprising:
   (a) preparing an alloy ingot comprising:
      25 to 45 weight % Zr+Hf, wherein said Hf does not exceed 4 weight %,
      1 to 15 weight % Ti,
      10 to 20 weight % Mn, 2 to 12 weight % V,
      0.6 to 5 weight % elemental rare earth,
      unavoidable impurities,
      and at least 25 weight % Ni,
   (b) homogenizing said ingot at a temperature of 950° C. to 1,050° C.;
   (c) heat treating said ingot at a temperature of 1,100° C. to 1,200° C.; and
   (d) quenching said ingot,
thereby obtaining said alloy comprising at least three phases.

22. A hydrogen occluding alloy as recited in claim 21, wherein said alloy comprises:
   25 to 37 weight % Zr
   0.1 to 2 weight % Hf,
   5 to 15 weight % Ti,
   10 to 20 weight % Mn, 2 to 6 weight % V,
   0.6 to 5 weight % of at least one of La and Ce,
   unavoidable impurities,
   and the balance Ni,
   the amount of Ni being at least 25 weight %.

23. A hydrogen occluding alloy as recited in claim 21, wherein said alloy comprises:
   30 to 38 weight % Zr+Hf, wherein said Hf does not exceed 2 weight %,
   4 to 9 weight % Ti,
   14 to 18 weight % Mn, 4 to 8 weight % V, 1 to 4 weight % of elemental rare earth,
   unavoidable impurities,
   and the balance Ni,
   the amount of Ni being at least 25 weight %.

24. A hydrogen occluding alloy as recited in claim 21, wherein said alloy comprises:
   30 to 37 weight % Zr,
   0.1 to 2 weight % Hf,
   5 to 9 weight % Ti,
   14 to 18 weight % Mn, 4 to 6 weight % V,
   1 to 4 weight % of at least one of La and Ce,
   unavoidable impurities,
   and the balance Ni,
   the amount of Ni being at least 25 weight %.

25. A hydrogen occluding alloy comprising at least three phases, said alloy being made by a process comprising:
   (a) preparing an alloy ingot comprising:
      25 to 45 weight % Zr+Hf, wherein said Hf does not exceed 4 weight %,
      1 to 15 weight % Ti,
      10 to 20 weight % Mn, 2 to 12 weight % V,
      0.6 to 5 weight % elemental rare earth,
      unavoidable impurities,
      and at least 25 weight % Ni,
   (b) heat treating said ingot at a temperature of 1,100° C. to 1,200° C.; and
   (c) quenching said ingot, thereby obtaining said alloy comprising at least three phases.

\* \* \* \* \*